US006738133B1

United States Patent
Yin

(10) Patent No.: US 6,738,133 B1
(45) Date of Patent: May 18, 2004

(54) METHOD AND DEVICE FOR MEASURING SINGLE-SHOT TRANSIENT SIGNALS

(75) Inventor: Yan Yin, Fremont, CA (US)

(73) Assignee: YY Labs, Inc., Fremont, CA (US)

( * ) Notice: Subject to any disclaimer, the term of this patent is extended or adjusted under 35 U.S.C. 154(b) by 48 days.

(21) Appl. No.: 10/116,965

(22) Filed: Apr. 4, 2002

(51) Int. Cl.⁷ .................................................. G01J 1/42
(52) U.S. Cl. ...................... 356/218; 356/73.1; 356/5.01
(58) Field of Search ............................... 356/218, 73.1, 356/5.01, 5.05, 345, 28.5; 359/124, 127, 130, 131, 110; 455/605, 608

(56) References Cited

U.S. PATENT DOCUMENTS

| | | | | |
|---|---|---|---|---|
| 4,777,661 A | * | 10/1988 | Spillman, Jr. | 398/168 |
| 5,381,426 A | * | 1/1995 | Fontana et al. | 372/18 |
| 5,589,929 A | * | 12/1996 | Li | 356/5.01 |
| 5,740,117 A | * | 4/1998 | Bona et al. | 365/215 |
| 5,754,284 A | * | 5/1998 | Leblanc et al. | 356/73.1 |
| 6,288,810 B1 | * | 9/2001 | Grasso et al. | 398/9 |
| 6,574,016 B1 | * | 6/2003 | Harley et al. | 398/79 |

OTHER PUBLICATIONS

Emmanuel Desurvire, John Wiley & Sons, "*Erbium–Doped Fiber Amplifiers: Principles And Applications*", (Mar. 1994) pp. 499–500.

* cited by examiner

*Primary Examiner*—Frank G. Font
*Assistant Examiner*—Sang H. Nguyen
(74) *Attorney, Agent, or Firm*—Beyer Weaver & Thomas LLP

(57) ABSTRACT

Methods, apparatus, and systems, including computer program products, implementing and using techniques for measuring multi-channel single-shot transient signals. A signal acquisition unit receives one or more single-shot pulses from a multi-channel source. An optical-fiber recirculating loop reproduces the one or more received single-shot optical pulses to form a first multi-channel pulse train for circulation in the recirculating loop, and a second multi-channel pulse train for display on a display device. The optical-fiber recirculating loop also optically amplifies the first circulating pulse train to compensate for signal losses and performs optical multi-channel noise filtration.

29 Claims, 2 Drawing Sheets

US 6,738,133 B1

METHOD AND DEVICE FOR MEASURING SINGLE-SHOT TRANSIENT SIGNALS

The U.S. Government has a paid-up license in this invention and the right in limited circumstances to require the patent owner to license others on reasonable terms as provided for by the terms of Grant No. DE-FG03-98ER82719 awarded by the Department of Energy.

BACKGROUND

This invention relates to testing and measurement of optical and electrical signals.

Single-shot transient signals having a frequency of 6 GHz or less can be measured using a real-time oscilloscope, such as the Tectronics Inc. TDS6604 oscilloscope, manufactured by U.S. Tectronix Incorporated, Beaverton, Oreg. Another instrument for measuring a single-shot transient signal is a streak camera, which can cover frequencies ranging from the MHz-range up to about 100 GHz, such as the Hamamatsu C5680 streak camera, manufactured by Hamamatsu, Japan. Currently, there are no other instruments available for measuring a transient signal with a frequency response up to 100 GHz.

The upper frequency limit for the single-shot transient signals that can be measured with a real-time oscilloscope is determined by the sampling rate of the real-time oscilloscope. Higher frequency responses, up to 50 GHz or higher, can easily be measured with a sampling oscilloscope. However, a sampling oscilloscope can only measure repetitive signals and not single-shot transient signals.

The above-mentioned streak camera works as follows. An electrical or optical signal is converted into a low-energy, secondary electron beam by letting the input electrical or optical beam strike a photo-multiplier tube (PMT). The low-energy secondary electron beam has the same energy distribution as the original signal. The low-energy secondary electron beam passes between a pair of deflecting electrodes that deflect the secondary electron beam as the secondary electron beam passes between the electrodes. The secondary, deflected electron beam then strikes a photon receiver, such as a charge-coupled device (CCD) camera. The CCD camera converts the energy distribution in the secondary electron beam, and consequently in the original electrical or optical signal, to a distribution that can be displayed. Presently, the streak camera is the only available type of measurement instrument permitting single-shot transient signal measurement for signals in the pico-second range. A streak camera is a very expensive measurement instrument and can only perform single-channel measurements.

In the telecommunications area, a common task is to ascertain how the temporal shape of a pico-second optical signal changes when the optical signal passes through an optical fiber over a long distance. The bitrate in optical transmission lines in telecommunication systems is typically 10 Gb/s, or in some cases even 40 Gb/s. Since signal deterioration may cause the error-bit-rate to increase, it often is necessary to understand how various dispersions along the optical path affect the pulses when the optical signals pass through a long route of several hundreds or thousands of kilometers fiber, as well as various optical devices and amplifiers. Therefore, a transient signal oscilloscope, which shows the real-time waveform of the signal, with frequency responses from 10 Gb/s to 40 Gb/s will be a very useful tool for this application.

So-called optical recirculating loops have been used for the simulation of long-haul optical transmission lines. One example of such use of a single-channel recirculating loop is given on page 455 of "Erbium-Doped Fiber Amplifiers: Principles and Applications" by Emmanuel Desurvire, John Wiley & Sons, March, 1994.

SUMMARY

In general, in one aspect, this invention provides methods, apparatus, and systems, including computer program products, implementing and using techniques for measuring multi-channel single-shot transient signals. A signal acquisition unit receives one or more single-shot transient pulses from one or more transient signal sources. An optical-fiber recirculating loop reproduces the one or more received single-shot optical pulses to form a first multi-channel pulse train for circulation in the recirculating loop, and a second multi-channel pulse train for sampling and display on a sampling and display device. The optical-fiber recirculating loop also optically amplifies the first circulating pulse train to compensate for signal losses and performs optical multi-channel noise filtration.

Advantageous implementations can include one or more of the following features. The signal losses can include losses caused by split-off from the first multi-channel pulse train in the recirculating loop. The transient pulses can be optical multi-channel single-shot pulses. The signal acquisition unit can select the pulses using a gating circuit. The signal acquisition unit further can time multiplex the selected pulses using optical delay lines of different lengths. The signal acquisition units can wavelength multiplex the selected pulses using an n×1 optical add/drop multiplexer. The measurement instrument can be used for multi-channel signal reproduction. The optical fiber recirculating loop can perform noise filtration using two acoustic modulators, two n×1 OADMs, and n delay lines of different length. The display device can be a correlator. The display device can be a sampling oscilloscope. The signal acquisition unit can select one or more targeted electrical single-shot pulses from the first and the second pulse trains using a gating circuit. The single-shot pulses can be electrical multi-channel single-shot pulses and the signal acquisition unit can includes one or more modulators and one or more bias setting circuits that can convert the electrical pulses into optical pulses. The optical-fiber recirculating loop can perform optical multi-channel noise filtration using two acoustic modulators, two n×1 OADMs, n delay lines of different length; and realign the timing of the multi-channel pulse trains, so that the acoustic modulators, and the OADMs permit recovery of the original time sequence of the first and second pulse trains for display on a sampling oscilloscope or other correlator. The frequency of the one or more single-shot pulses can be less than 100 GHz.

The invention can be implemented to realize one or more of the following advantages. A measurement instrument is provided that is based on different physical principles than current measurement instruments, through the use of fiber optical technologies. The high-frequency response of optical fibers can be used to convert single-shot multi-channel signals into a repetitive multichannel pulse train, thereby allowing a sampling oscilloscope to be used for extracting the shape of the original signals. Such a multi-channel single-shot instrument, based on an optical-delay line recirculating loop, is complete new. The technical difficulties associated with high-speed sampling are greatly reduced. Electronic components used by the measurement system can operate at low speed, which reduces the overall cost of the instrument as compared to conventional measurement instruments using high-speed electronic components. Dispersions and other difficulties associated with fibers can be compensated for in much more efficient ways, such as through dispersion compensation, as compared to coaxial cables.

The temporal distribution of an optical or electrical multi-channel transient signal, in particular for the 10 GHz to 50 GHz frequency response range, can be measured. The frequency response in 10 Gb/s to 40 Gb/s transmission lines can be measured, which is important in the telecommunications area. A significant reduction of noise produced by an Erbium-doped fiber amplifier can be achieved in the multi-channel measurement instrument, which permits more than a 1000-fold reproduction of the original multi-channel signals. A user-friendly measurement system is provided in which the manual setting procedures have been reduced to a minimum compared to conventional measurement instruments.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

An objective of the present invention is to provide a multi-channel single-shot transient signal measurement device, including a single-shot transient signal capturing device for capturing both electrical and optical signals, and a pulse train generator based on an optical recirculating loop, to be used together with a sampling oscilloscope or some other type of correlator, for measuring the temporal shape of multi-channel single-shot signals. It also is an objective to provide an optical circuit that can be used for data storage or other optical communication applications.

Figure 1:
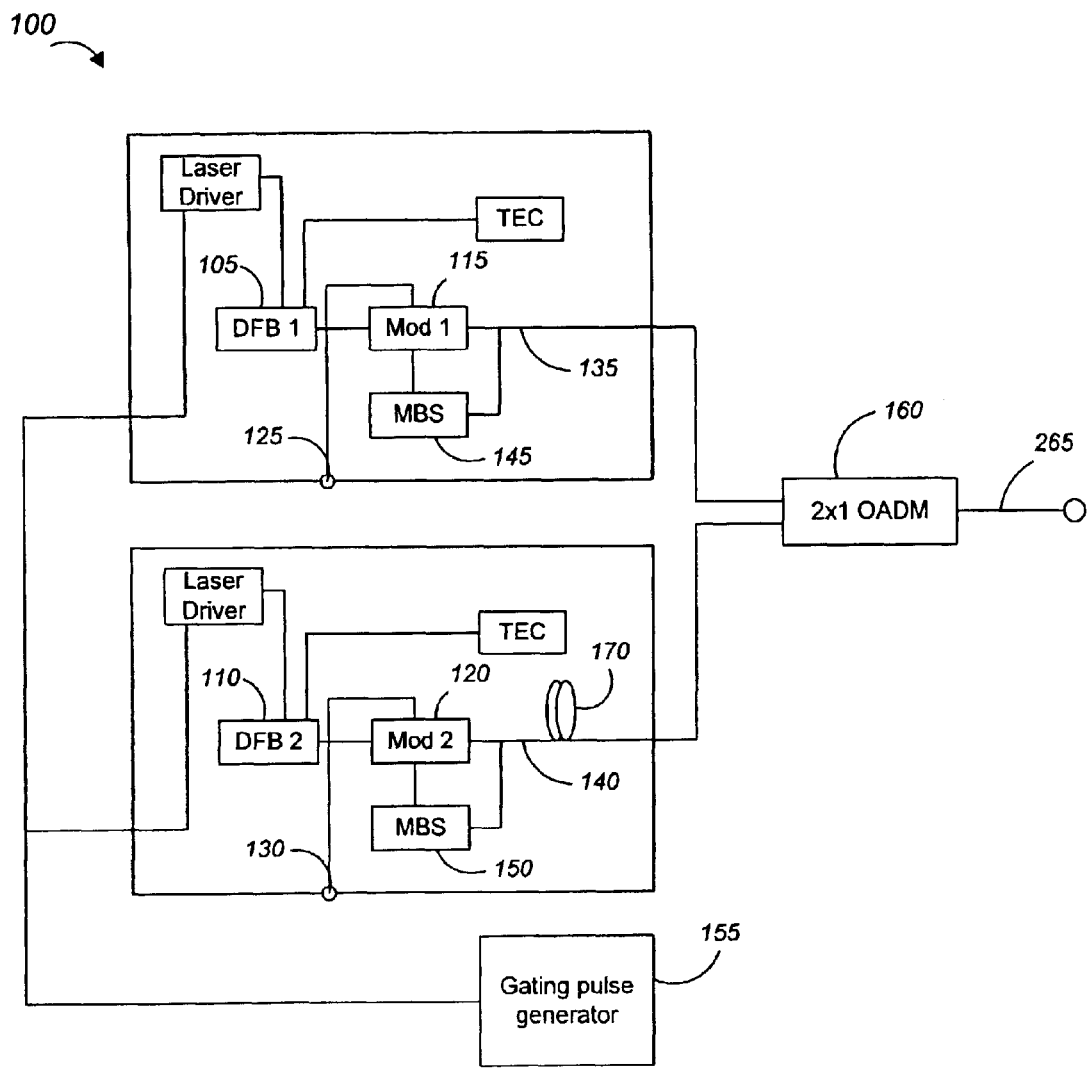
FIG. 1 is a schematic diagram showing one implementation of an electrical single-shot signal capture system in accordance with the invention.

As shown in FIG. 1, in one implementation for electrical single-shot transient signal measurement, a signal-capturing device (100) includes a two-channel electrical and optical converter. In each channel of the device (100), two distributed feedback (DFB) lasers (105, 110) serve as light sources for the respective channel. Two LiNbO$_3$ intensity modulators (115, 120) convert two single-shot transient input signals (125, 130) into two optical signals (135, 140), having the same respective intensity distributions as the original input signals (125, 130). The working function of the intensity modulators, that is, the relationship between the modulator DC bias voltage and the optical output power for each modulator, is a sine wave. Therefore, the range close to the quadrature point is considered to be linear and the optical signals (135, 140) converted from the electrical signals (125, 130) have the smallest possible distortion when the intensity modulators work at the quadrature point. A modulator bias-setting circuit (145, 150) for each intensity modulator ensures that the intensity modulator (115, 120) operates at the quadrature point. The modulator bias-setting circuit (145, 150) calibrates the modulator working function before the measurement, and then sets the bias at the quadrature point for the measurement.

An optical gating circuit selects a targeted signal from a pulse train. In each channel, the gating function provided by the gating circuit is implemented as a single-shot gating signal generator (155) that is applied to the DFB lasers (105, 110) and functions as a switch In order to avoid fast optical switching, which is very expensive, wavelength multiplexers or demultiplexers are used to combine or separate the two optical signals. Therefore, the wavelengths of the DFB lasers (105, 110) for each channel are different. A 2×1 Optical Add/Drop Multiplexer (OADM) (160) is used to multiplex the two signals (135, 140) together in both the wavelength and time domains. The combined signals are delivered to a main system, which will be described below with reference to FIG. 2.

An output signal (165) from the signal capture device (100) acts as an input signal for a recirculating loop in the pulse train generator device. The signal (140) in one of the channels passes through a fixed fiber delay line (170) in order to separate the two signals (135, 140) in time so that cross talk between the signals (135, 140) can be avoided while the signals (135, 140) circulate in the recirculating loop.

Figure 2:
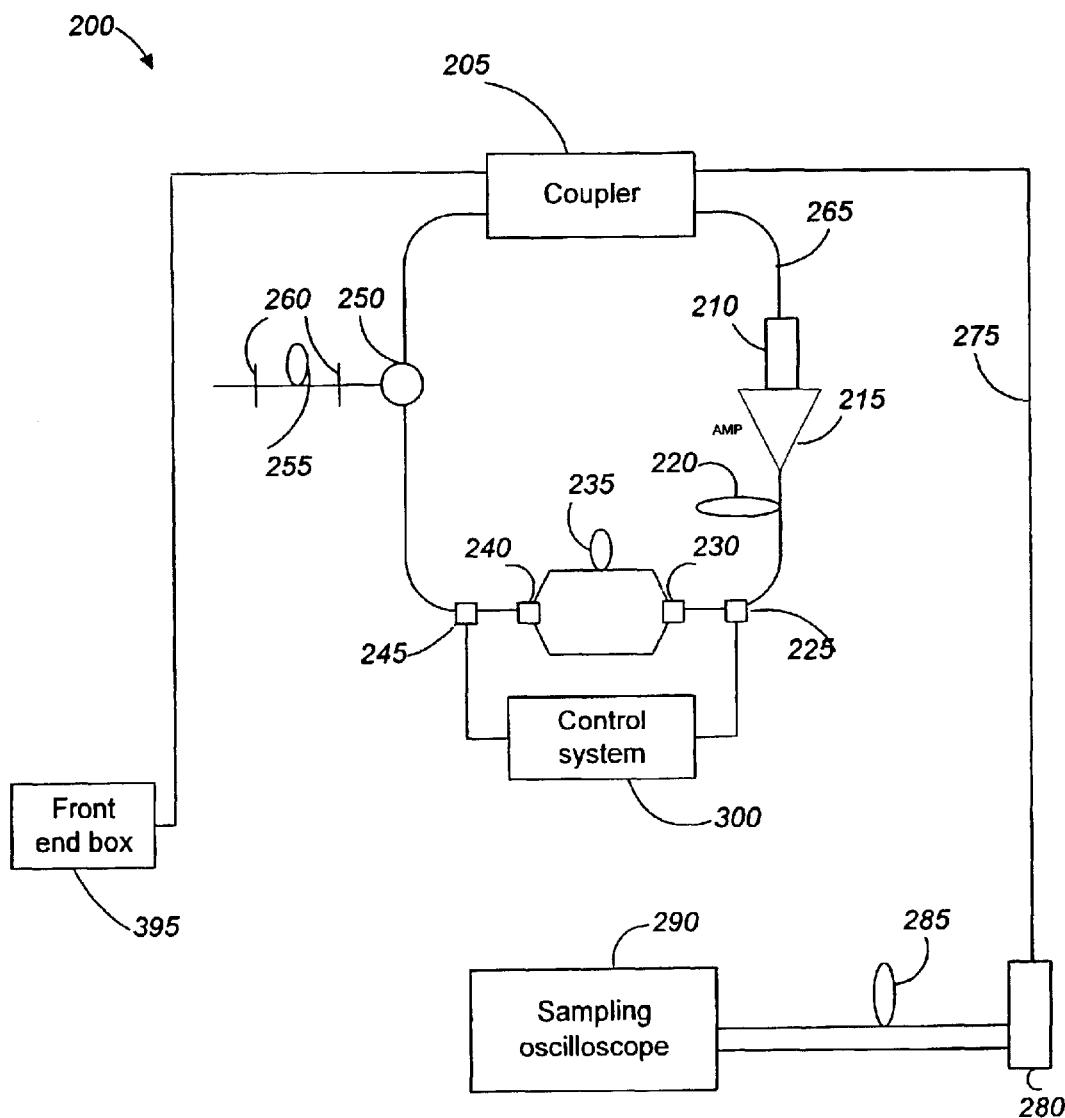
FIG. 2 is a schematic diagram showing the pulse train generator based on a recirculating loop in accordance with the invention.

FIG. 2 shows an implementation of a two-channel pulse train generator in accordance with the invention. The output signal from the signal capturing device (100), hereinafter referred to as the input signal for the recirculating loop, enters a coupler (205), which splits the input signal into two parts (265, 275). The first part (275) of the input signal is used for display by a sampling oscilloscope (290), and the second part (265) of the input signal is injected into a recirculating loop, also referred to as a ring.

In the ring, the input signal (265) passes through an isolator (210) and an Erbium-doped fiber amplifier (EDFA) (215). The amplifier (215) is optically pumped to produce gain. In the absence of any signal input, spontaneous emission events in the optical amplifier are amplified. These spontaneous emission events are usually referred to as amplified spontaneous emission (ASE). The amplifier (215) is actually bi-directional with ASE leaving both ends of the fiber. The optical isolator (210) prevents interference with the input signal by backward ASE and other reflections from imperfect connections of the fiber components. In each circulation, part of the signal (265) is split out of the ring. There are also other losses in the ring due to the acoustic modulators (AOM1, AOM2) (245, 225) and other optical components. Therefore, energy compensation is needed. The EDFA (215) compensates for the energy losses that the input signal (265) experiences in the ring.

The ring includes a total of two kilometers of optical fiber (220), also referred to as the first delay line, which produces the delay in the signal (265). A first optical circuit with AOM1 (225), AOM2 (245), two OADMs (230, 240), and a delay line (235), referred to as the second delay line, which applies extra delay to the first of the two pulses in the input signal (265), is used to filter out ASE. A second optical circuit with a circulator (250), two Bragg gratings (260), and a third delay line (255) having one-half the length of the second delay line (235), applies the same delay as delay line (235) to the second pulse in the input signal (265). Therefore, the timing relation between the two pulses in the input signal (265) can be recovered. This second optical circuit can use the same structure as that of the first two-OADM structure, but with its delay line on the other branch. AOM1 (225) and AOM2 (245) are used as switches and variable attenuators. These two AOMs (225, 245) have opposite wavelength shifts, so that the signal (265) circulating in the ring does not experience any wavelength shift, which permits the pulses to circulate in the ring as long as needed.

There are many types of noise that may occur in the ring. One example of noise is ASE produced by the EDFA (215). This type of noise occurs even without any input signals in the ring. Another example of noise is stimulated noise, which is a time-delayed, scaled replica of the signal power. Consequently, the stimulated noise contains the same wavelength as the signals to be measured, but with a certain delay. The ASE and the stimulated noise may accumulate turn by turn in the ring, which causes the quality of the circulating signal to deteriorate rapidly. The two 2×1 OADMs (230, 240) separate the pulses from the two channels, which have different wavelengths, and filter out the ASE with wavelength outside the bandwidth of the OADMs. The delay line (235) adds extra delay between the two input pulses, which also separates the input pulses from their stimulated noise. If the timing between the two AOMs is correct, the above types of noises can be filtered out completely. In effect, optical multi-channel filtration for n channels can be achieved by two acoustic modulators for switching, two n×1 OADMs for multiplexing signals of different wavelengths, and n delay lines of different length for separating the signals from accompanying noises.

The first part (275) of the input signal is a pulse train formed by the signals that split out from the ring during each turn, and has the same shape as that of the input pulses from the two different channels in the input signal (165). OADM (280) separates these signals and leads the signals into two different channels of the sampling oscilloscope (290). A delay line (285) having the same length as the delay line (270) in FIG. 1, is applied to the channel that has not been delayed in the front-end (100). Thereby, the timing relation between the pulses in the two channels is recovered to yield the original relation between signals (125) and (130) in FIG. 1. The two pulse trains are applied to the sampling oscilloscope (290), which recovers the two original single-shot transient signals from the two pulse trains.

A number of embodiments of the invention have been described. Nevertheless, it will be understood that various modifications may be made without departing from the spirit and scope of the invention. For example, by using n DFB lasers, as well as n×1 OADM, delay lines of different length in different channels, and equipping each laser with its own driver, the front-end can be modified to accommodate n channels. Accordingly, other embodiments are within the scope of the following claims.

What is claimed is:

1. A measurement instrument for measuring multi-channel single-shot transient signals, comprising:
    a signal acquisition unit operable to:
        receive one or more single-shot transient pulses from one or more transient signal sources; and
    an optical-fiber recirculating loop operable to:
        reproduce the one or more received single-shot optical pulses to form a first multi-channel pulse train for circulation in the recirculating loop as a first circulating pulse train, and a second multi-channel pulse train for sampling and display on a sampling and display device;
        optically amplify the first circulating pulse train to compensate for signal losses; and
        perform optical multi-channel noise filtration.

2. The measurement instrument of claim 1, wherein the signal losses include losses caused by split-off from the first multi-channel pulse train in the recirculating loop.

3. The measurement instrument of claim 1, wherein the signal losses include losses caused by optical components in the recirculating loop.

4. The measurement instrument of claim 1, wherein the transient pulses are optical multi-channel single-shot pulses.

5. The measurement instrument of claim 1, wherein the signal acquisition unit further is operable to select the pulses using a gating circuit.

6. The measurement instrument of claim 1, wherein the signal acquisition unit further is operable to time multiplex the selected pulses using optical delay lines of different lengths.

7. The measurement instrument of claim 1, wherein the signal acquisition unit further is operable to wavelength multiplex the selected pulses using an n'1 optical add/drop multiplexer.

8. The measurement instrument of claim 1, wherein the measurement instrument is operable to be used for multi-channel signal reproduction.

9. The measurement instrument of claim 1, wherein the optical fiber recirculating loop is operable to perform noise filtration using two acoustic modulators, two n'1 OADMs, and n delay lines of different length.

10. The measurement system of claim 1, wherein the display device is a correlator.

11. The measurement system of claim 1, wherein the display device is a sampling oscilloscope.

12. The measurement instrument of claim 1, wherein the signal acquisition unit further is operable to select one or more targeted electrical single-shot pulses from the first and the second pulse trains using a gating circuit.

13. The measurement instrument of claim 1, wherein the single-shot pulses are electrical multi-channel single-shot pulses and the signal acquisition unit further includes one or more modulators and one or more bias setting circuits operable to convert the electrical pulses into optical pulses.

14. The measurement instrument of claim 1, wherein the optical-fiber recirculating loop further is operable to:
    perform optical multi-channel noise filtration using two acoustic modulators, two n×1 OADMs, n delay lines of different length; and
    realign the timing of the multi-channel pulse trains, so that the acoustic modulators, and the OADMs permit recovery of the original time sequence of the first and second pulse trains for display on a sampling oscilloscope or other correlator.

15. The measurement instrument of claim 14, wherein the acoustic modulators are used as acoustic attenuators.

16. The measurement instrument of claim 1, wherein the frequency of the one or more single-shot pulses is less than 100 GHz.

17. A method for measuring multi-channel single-shot transient signals, comprising:
    receiving one or more single-shot transient pulses from one or more transient signal sources;
    reproducing the one or more received single-shot optical pulses to form a first multi-channel pulse train for circulation in the recirculating loop as a first circulating pulse train, and a second multi-channel pulse train for sampling and display on a sampling and display device;
    optically amplifying the first circulating pulse train to compensate for signal losses; and
    performing optical multi-channel noise filtration.

18. The method of claim 17, wherein the signal losses include losses caused by split-off from the first multi-channel pulse train in the recirculating loop.

19. The method of claim 17, wherein the signal losses include losses caused by optical components in the recirculating loop.

20. The method of claim 17, wherein the transient pulses are optical multi-channel single-shot pulses.

21. The method of claim 17, further comprising selecting the pulses using a gating circuit.

22. The method of claim 17, further comprising time multiplexing the selected pulses using optical delay lines of different lengths.

23. The method of claim 17, further comprising wavelength multiplexing the selected pulses using an n×1 optical add/drop multiplexer.

24. The method of claim 17, further comprising performing noise filtration using two acoustic modulators, two n×1 OADMS, and n delay lines of different length.

25. The method of claim 17, further comprising selecting one or more targeted electrical single-shot pulses from the first and the second pulse trains using a gating circuit.

26. The method of claim 17, wherein the single-shot pulses are electrical multi-channel single-shot pulses and further comprising converting the electrical pulses into optical pulses.

27. The method of claim 17, further comprising:

performing optical multi-channel noise filtration using two acoustic modulators, two n×1 OADMs, n delay lines of different length; and realigning the timing of the multi-channel pulse trains, so that the acoustic modulators, and the OADMs permit recovery of the original time sequence of the first and second pulse trains for display on a sampling oscilloscope or other correlator.

28. The method of claim 27, wherein the acoustic modulators are used as acoustic attenuators.

29. The method of claim 17, wherein the frequency of the one or more single-shot pulses is less than 100 GHz.

* * * * *